United States Patent [19]
Zahn et al.

[11] Patent Number: 6,146,817
[45] Date of Patent: Nov. 14, 2000

[54] METHOD OF AND APPARATUS FOR MASKING A MASTER FOR REPRODUCTION

[75] Inventors: Wolfgang Zahn; Friedrich Jacob, both of Munich; Günter Findeis, Sauerlach, all of Germany

[73] Assignee: AGFA-Gevaert Aktiengesellschaft, München, Germany

[21] Appl. No.: 08/480,283

[22] Filed: Jun. 7, 1995

Related U.S. Application Data

[63] Continuation of application No. 07/804,844, Dec. 6, 1991, abandoned.

[51] Int. Cl.[7] .................................................. G03C 5/08
[52] U.S. Cl. ..................... 430/396; 355/77; 355/132; 355/125; 430/5; 430/394; 358/447; 358/532
[58] Field of Search ........................... 355/40, 125, 132, 355/77, 421; 358/532, 447; 430/5, 396, 394

[56] References Cited

U.S. PATENT DOCUMENTS

| | | | |
|---|---|---|---|
| 2,420,636 | 5/1947 | Yule | 355/77 |
| 2,455,849 | 12/1948 | Yule | 430/396 |
| 2,691,696 | 10/1954 | Yule | 358/447 |
| 3,311,918 | 3/1967 | Koster | 430/394 |
| 3,411,405 | 11/1968 | Mooney et al. | 430/396 |
| 3,510,305 | 5/1970 | Craig et al. | 430/394 |
| 3,615,433 | 10/1971 | Biernson et al. | 355/132 |
| 3,680,956 | 8/1972 | Custer | 355/71 |
| 3,761,171 | 9/1973 | Fields | 430/20 |
| 3,867,150 | 2/1975 | Ketley | 430/396 |
| 4,237,481 | 12/1980 | Aughton | 358/80 |
| 4,394,089 | 7/1983 | McIntosh et al. | 355/132 |
| 4,397,545 | 8/1983 | Terashita | 355/77 |
| 4,646,252 | 2/1987 | Terashita | 355/77 |
| 4,747,052 | 5/1988 | Hishinuma et al. | 358/447 |
| 4,757,351 | 7/1988 | Birgmeir | 355/77 |
| 5,045,419 | 9/1991 | Okumura | 430/5 |
| 5,077,154 | 12/1991 | Corley | 430/396 |
| 5,155,524 | 10/1992 | Oberhardt et al. | 355/77 |
| 5,204,919 | 4/1993 | Murakami | 358/447 |

FOREIGN PATENT DOCUMENTS 3141263  6/1983  Germany.

*Primary Examiner*—Martin Angebranndt
*Attorney, Agent, or Firm*—Darby & Darby

[57] ABSTRACT

A negative to be printed is masked. The mask, or an image of the mask in the plane of the negative, or both the mask and the image, have a low resolution of 0.1 to 2 line pairs per millimeter.

32 Claims, 4 Drawing Sheets

METHOD OF AND APPARATUS FOR MASKING A MASTER FOR REPRODUCTION

This is a continuation of application Ser. No. 07/804,844, filed Dec. 6, 1991, now abandoned.

CROSS-REFERENCE TO RELATED APPLICATION

This application contains subject matter similar to that disclosed in the commonly-owned patent application Ser. No. 07/832,839 of Knut Oberhardt et. al. filed Jan. 18, 1992 for "Photographic Copier With Masking Device and Coping Method", now U.S. Pat. No. 5,155,524.

BACKGROUND OF THE INVENTION

The invention relates generally to the reproduction of a master.

More particularly, the invention relates to a method of and an apparatus for masking a master, especially a photographic master, preparatory to reproduction.

When photographs have large brightness variations in individual regions, the bright zones are frequently overexposed and the dark zones frequently underexposed in copies of the photographs. Consequently, details and fine structures are very poorly, or not at all, reproduced on the copies.

The German Offenlegungsschrift 31 41 263 describes a method of copying color diapositives on reversal paper using masks for contrast reduction. The diapositive is placed in direct contact with phototropic glass and ultraviolet light or the like is then passed through the diapositive into the glass. A black-and-white mask representing a negative of the diapositive is thus produced in the phototropic glass. The composite of mask and diapositive is thereupon illuminated in the opposite direction while remaining in the same position. The diapositive is thereby reproduced on the reversal paper with low contrast.

Due to the direct contact between the masking glass and the diapositive, a relatively sharp mask is produced in this method and is sharply imaged on the reversal paper. To obtain copies of high quality, it is necessary for the mask and the diapositive to be practically one hundred percent in register during exposure. However, this is precluded because the materials, namely, the film material and the glass, are different. During the very intensive exposure, the materials are heated relatively strongly and expand to different degrees. The copies obtained are then of lower quality and the dark/bright gradations of the mask which do not precisely register with the dark/bright gradations of the diapositive are clearly visible.

If, as described in the Offenlegungsschrift, the method is employed in a large laboratory with automatic copiers, additional difficulties arise because of rapid, jerking movements to which the composite of masking glass and diapositive is subjected between the individual stations. Shifting can again occur and even more strongly influence the quality of the copies.

SUMMARY OF THE INVENTION

It is an object of the invention to provide a reproduction method for masters which enables copies of better quality to be obtained.

Another object of the invention is to provide a masking method which can cause small relative displacements, or differential expansion, of master and mask to have little, if any, effect on copy quality.

A further object of the invention is to provide a reproduction apparatus for masters which can yield copies of better quality. Is An additional object of the invention is to provide an apparatus having a masking arrangement which can cause small relative displacements, or differential expansion, of master and mask to have little or no effect on copy quality.

The preceding objects, as well as others which will become apparent as the description proceeds, are achieved by the invention.

One aspect of the invention resides in a method of reproducing a master, particularly a photographic master. The method comprises the steps of masking the master, and copying the masked master on photosensitive material. The masking step includes generating a mask, preferably a black-and-white mask, which represents a negative of the master. At least one of the masking and copying steps is performed in such a manner that the mask, or a reproduction of the mask in the plane of or on the master, or both the mask and the reproduction, have low resolution.

In one embodiment of the method, the mask has low resolution and the copying step comprises sharply focusing the mask on the photosensitive material. The resolution of the mask may be 0.1 to 2 line pairs per millimeter and can advantageously be 0.7 line pair per millimeter.

According to another embodiment of the method, the mask has high resolution, i.e., is sharp, and the copying step comprises forming a low resolution reproduction of the mask on the master. This reproduction of the mask may again have a resolution of 0.1 to 2 line pairs per millimeter and preferably has a resolution of 0.7 line pair per millimeter.

In accordance with a further embodiment of the method, both the mask and the reproduction thereof on the master have low resolution. The mask and its reproduction may here each have a resolution of 0.1 to 2, and advantageously 0.7, line pairs per millimeter.

The method may further comprise the step of scanning the master to generate density values. At least one of the masking and copying steps is then performed using such density values.

The result obtained in each of the three embodiments outlined above is an unsharp or diffuse intensity distribution on the photosensitive material or paper. The unsharpness is such that the sharp image of a line of the master always lies within the range of the unsharp image of the corresponding line of the mask. The unsharpness or diffuseness of the intensity distribution on the photosensitive paper depends upon the particular magnification. For example, with a conventional small format film and an experimentally tested mask resolution of 0.7 line pair per millimeter, the resolution of an image of the mask in the plane of the master should lie approximately at the upper boundary of the given range for a master having a size of 0.8×1.1 centimeters and approximately at the lower boundary of the given range for a master having a size of 20×25 centimeters.

The mask may be generated in a variety of ways. For instance, the mask may be produced immaterially and stored in an electronic memory in the form of pixels, i.e., the operation of generating the mask may be performed electronically in a memory. Exposure of the photosensitive paper may then be carried out pointwise using a cathode ray tube or a laser. It is possible here to enter data on the master in a memory and to account for such data in the data for the mask. In this case, exposure of the photosensitive paper takes place directly without the master. When the master is transparent, it is further possible to expose via the master and to additionally employ data on the mask in calculating the exposure data. The copying step then comprises transmitting copy light to the photosensitive paper through the master. In each of these two procedures, a reduction in contrast as well as an increase in contrast may be achieved.

An immaterially generated mask which exists solely as a set of data has the added advantage that the data set can be processed as desired, and the method may further comprise the step of processing the mask so that a region of the mask having a predetermined intensity is imaged on the photosensitive paper on a reduced scale. For instance, dark regions of the mask may be reduced somewhat so that the corresponding bright/dark transitions always lie within the dark zones of the copy and are accordingly less noticeable. This allows the quality of the copy to be further increased.

The mask may also be generated materially using a phototropic masking element which may comprise phototropic glass, a phototropic foil or glass having a phototropic coating. When the master is transparent and the operation of generating the mask is performed using a phototropic masking element, the copying step may comprise transmitting copy light to the photosensitive paper through the master and the masking element, i.e., exposure of the photosensitive paper may take place via the master and the mask.

An intermediate stage between a purely immaterial mask and a purely material mask can be achieved with an electronically adjustable masking element or matrix. Since the mask fundamentally exists as a data set, there is the advantage that the mask can be changed. On the other hand, exposure can be carried out in the conventional manner employed for material masks. Thus, when the master is transparent and the operation of generating the mask is performed using an electronically adjustable masking element or matrix, the copying step can comprise transmitting copy light to the photosensitive paper through the master. Pointwise exposure is not necessary. By way of example, a liquid crystal display or electronically adjustable light valve arrangement can be used as a transparent masking matrix. The masking element or matrix can likewise include a plasma display. Furthermore, reflective, electrooptical components whose reflectivity can be changed region-by-region are on the market and can be used to generate the mask.

In order to avoid substantially greater illumination intensities and longer exposure times upon masking, it is of advantage to design the mask so that its brightest location produces virtually no darkening effect. A transilluminated mask should have its maximum transparency at this location. The operation of generating the mask is performed in such a manner that the mask has a region of maximum brightness corresponding to a predetermined zone of the photosensitive paper, and the copying step includes limiting darkening of the predetermined zone to that resulting from the characteristics of the paper, i.e., limiting darkening to the unavoidable dimming effect caused by the paper.

The method of the invention can be applied with advantage in large laboratories having printers or copiers which include automatic exposure control units and serve to make paper prints of negative or positive films. The density values of the masked master (harmonized densities) must here be used for exposure control, and the method further comprises the steps of determining the density values for the masked master and calculating an amount of copy light for the copying step using such density values. The copying step comprises automatically controlling exposure of the photosensitive paper.

In a preferred embodiment of the method, the amount of copy light is obtained purely mathematically. The step of determining the density values for the masked master here comprises scanning the master, or measuring the master by means of a scanner, to obtain first density values, and deriving second density values for the mask from the first density values. The calculating step is thereupon performed using the first and second density values. The first density values for the master may be stored, and the second density values for the mask may be obtained from the first density values by means of special algorithms. The amount of copy light is now calculated from the two sets of density values, namely, the first density values for the master and the second density values for the mask.

The amount of copy light may be calculated in other than a purely mathematical manner. To this end, the method again comprises the steps of scanning the master to obtain first density values, and deriving second density values for the mask from the first density values. However, in this case, the mask is generated using the second density values, and the density values for the masked master are determined by once more scanning the master after the latter has been masked with the thus-generated mask. The density values obtained by measurement of the masked master provide the basis for calculation of the amount of copy light.

The two procedures outlined above for calculating the amount of copy light allow the copying operation to be fully automated. With the aid of a decision logic circuit, a determination can be made, e.g., based on the range of contrast, as to whether a mask should be generated and, if so, how the mask should be designed. The method here further comprises the steps of scanning the master to obtain density values, and automatically determining the degree of masking using the density values. By means of such a procedure, copies or prints of high quality can be produced fully automatically.

In order to make the method of the invention suitable for the very exacting field of professional photography, it is necessary to make provision for manual intervention by an operator. This can be achieved in an advantageous manner by displaying a first image of the master while unmasked, and displaying a second image of the master while masked. An operator then has the opportunity to evaluate the images and adjust the same if required. The images can be displayed in color or in black-and-white. A single color or black-and-white monitor can be used to display the images or, alternatively, two separate color monitors or two separate black-and-white monitors can be employed. The images can be produced on the basis of density values obtained by scanning the master.

The operator can adjust the degree of masking and this will change the image in which the master is masked. The effect of an adjustment in the degree of masking can be immediately evaluated by the operator on the monitor exhibiting the image of the masked master.

The operator can further adjust the density and color of each image by modifying the image signals, i.e., the density values for the three primary colors red, green and blue, generated during scanning of the master. Modification of the density values and colors is visible in each of the images.

Another aspect of the invention resides in an apparatus for reproducing a master, particularly a photographic master. The apparatus comprises means for measuring the density of the master, means for masking the master, and means for positioning the master at a predetermined location. The masking means includes an electrically adjustable masking element such as, for instance, a masking matrix. The apparatus further comprises means for copying the masked master when the master is at the predetermined location, and the processing means includes means for calculating mask density and controlling the masking element. The processing means has input means for the receipt of density signals from the measuring means and output means including at least one output for the transmission of control signals to the masking element.

The apparatus of the invention is particularly well-suited for carrying out the method according to the invention.

The copying means may include a shutter while the processing means may include means for determining and controlling exposure time. The output means of the processing means then includes at least one additional output for the transmission of control signals to the shutter.

The positioning means may comprise means for conveying the master along a predetermined path which includes the predetermined location. In one embodiment of the apparatus, the measuring means is disposed at a second location of the path upstream of the predetermined location.

The measuring means may include means for measuring the densities of the master in each of the three primary colors red, green and blue.

The copying means may further comprise a source of illumination and the masking element may be disposed between this source and the predetermined location. The copying means may also include means for holding a length of photosensitive is material at another location. A second embodiment of the apparatus comprises a directing element between the predetermined location and the other location for directing radiation to the measuring means. The directing element may be pivotable and may comprise a beam splitter.

The calculating means may include a logic circuit.

One embodiment of the apparatus includes first means for displaying the master while unmasked and second means for displaying the master while masked. The first and second means may each include a color monitor. The measuring means may here comprise a video camera, preferably a color camera.

The novel features which are considered as characteristic of the invention are set forth in particular in the appended claims. The improved copying or printing method, as well as the construction and mode of operation of the improved copier or printer, will, however, be best understood upon perusal of the following detailed description of certain specific embodiments when read in conjunction with the accompanying drawings.

DESCRIPTION OF THE PREFERRED EMBODIMENTS

Figure 1:
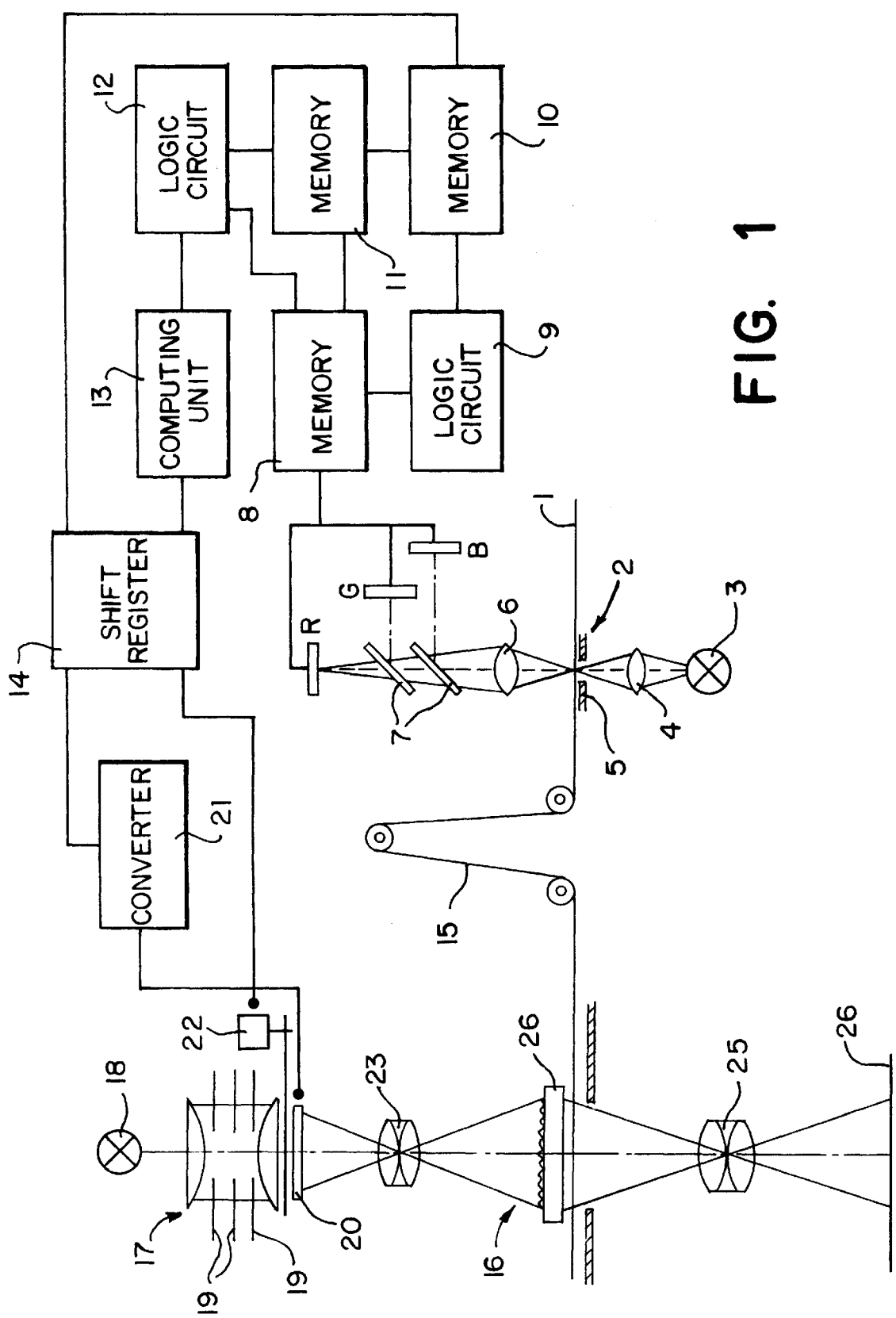
FIG. 1 schematically illustrates a printer in accordance with the invention which operates with purely mathematical exposure control.

Referring to FIG. 1, a length or strip of color film 1 is conveyed through a scanning station 2. The film 1 carries a series of masters or originals which are to be copied or printed in the copier or printer of FIG. 1, and the masters or originals are here assumed to be constituted by transparent negatives. The scanning station 2 has a light source 3, a lens 4 and a diaphragm 5 which serve to scan each negative pointwise. The light beam which passes through the film 1 is focused by the lens 6 and split into its primary color components red, green and blue by dichroitic reflectors or beam splitters 7. The individual colored beams then impinge upon respective rows of measuring cells R, G and B which are sensitized to the corresponding colors. The cells R, G, B function to measure the densities of the negatives in the three primary colors red, green and blue and generate image signals representing the respective density values. The density values are stored in a memory 8 with a resolution of about 500 to 1000 pixels. From the memory 8, the density values for each negative are sent to a logic circuit 9 which calculates a suitable mask for the respective negative. This mask, which is black-and-white, represents a negative of the corresponding negative on the film 1. The mask calculated by the logic circuit 9 is represented by density signals generated by the logic circuit 9, and the density values corresponding to these density signals are stored in a memory 10. Resultant density values are now calculated from the mask density values in the memory 10 and the negative density values in the memory 8. The resultant density values are stored in a memory 11. The density of a print or copy to be made from a respective negative is then calculated in a logic circuit 12 using the resultant density values in the memory 11. In individual cases, it can be useful to additionally employ the negative density values in the memory 8 for this purpose.

Calculation of the print density on the basis of the resultant density values has the advantage that the "density rejection rate" of the printer can be reduced as compared to printing without a mask. The logic circuit 12 normally calculates the print density based on the large area contrast and, as a result, errors can easily arise for negatives with very high contrast. However, since the large area contrast is condensed in practice by using the resultant density values, the calculated print densities can better approximate the required copy densities.

A computing unit 13 calculates the exposure time or shutter speed from the print density. The exposure time, as well as the mask density values from the memory 10, are then entered in a shift register 14.

After passing through the scanning station 2, the film 1 is advanced through a temporary storage zone 15 to a copying or printing station 16. As each negative enters the printing station 16, the corresponding values, i.e., the corresponding exposure time and corresponding mask density values, are recalled from the shift register 14.

The printing station 16 includes a source 18 of copy light which is disposed above a condenser unit 17 having a color filter or light mixing arrangement 19 whose function and control are conventional and will not be described here. The copy light passes through the condenser unit 17 where its color densities are corrected and then impinges upon an electrically controlled masking element in the form of an LCD matrix 20 located below the condenser unit 17.

The mask density values recalled from the shift register 14 enter a converter 21 which transforms the mask density values into control signals. These control signals are used to activate the matrix 20 which generates an appropriate mask for the respective negative in the printing station 16. The exposure time recalled from the shift register 14 serves to regulate the length of time for which a shutter 22 remains open during exposure.

The mask is imaged on a dispersion plate 24 via a lens unit or objective 23. The image of the mask and the negative in the printing station 16 are then copied, while in register, photosensitive paper 26 by means of a lens unit 25.

Figure 2:
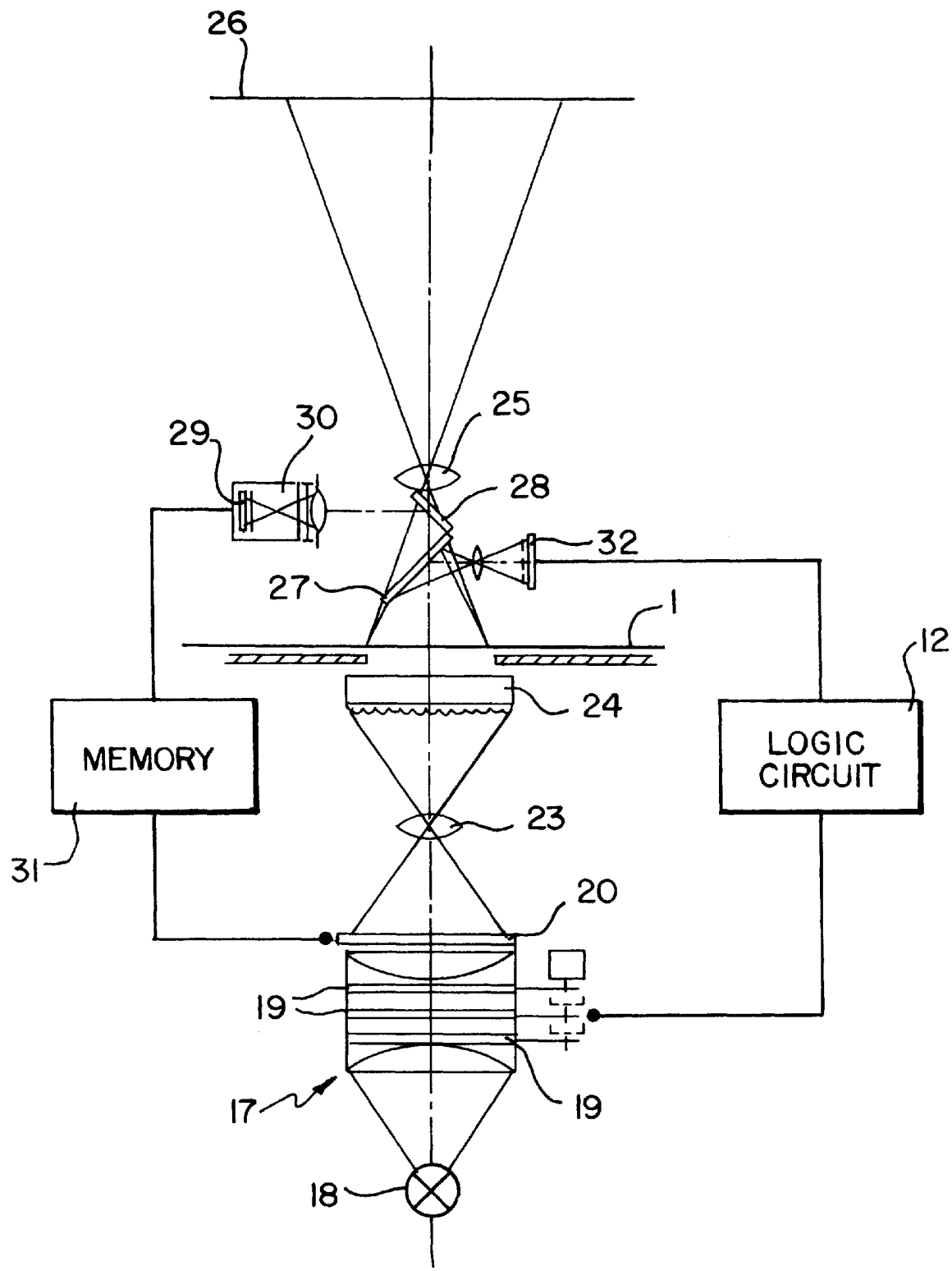
FIG. 2 schematically illustrates a printer in which exposure is controlled by measurement.

In FIG. 2, elements having the same function as those in FIG. 1 are identified by the same reference numerals.

Referring to FIG. 2, the film 1 is conveyed through a combined scanning and printing station. In this combined scanning and printing station, light from the light source 18 travels to the dispersion plate 24 via the condenser unit 17, the masking matrix 20 and the lens unit 23. When a negative of the film 1 arrives at the combined scanning and printing station, a pivotable reflector 27 is initially pivoted out of the optical path in a non-illustrated manner. The negative is then unsharply imaged on a flat, black-and-white CCD 29 of a video camera 30 via a second reflector 28 and suitable optical means. The CCD 29 generates output signals which represent a mask for the negative. As before, the mask is black-and-white and represents a negative of the negative on the film 1. The output signals of the CCD 29 are converted into control signals for the LCD matrix 20 and are stored in a memory 31. These controls signals are then used to activate the matrix 20 and generate a mask for the negative in the combined scanning and printing station.

Once the mask has been generated so that the negative is masked, the reflector 27 is pivoted back into the optical path. The reflector 27 thereupon causes a masked image of the negative to be formed on a flat, color CCD 32. The CCD 32 produces output signals representing resultant density values, i.e., density values which take into account the densities of both the negative and the mask, in the three primary colors red, green and blue. The CCD 32 is connected to the logic circuit 12 which receives the output signals of the CCD 32 and calculates the print density from the resultant density values. These values are now used to control the color filter or light mixing arrangement 19.

The reflector arrangement 27,28 can here serve as a shutter. During exposure, both of the reflectors 27,28 are pivoted out of the path of the copy light. The exposure time, that is, the time for which the shutter constituted by the reflectors 27,28 remains open upon exposure, is determined by the print density in a manner which is conventional and need not be detailed. When the shutter 27,28 is opened, the negative in the combined scanning and printing station is copied on the photosensitive paper 26 together with the mask via the lens arrangement 25.

Figure 3A:
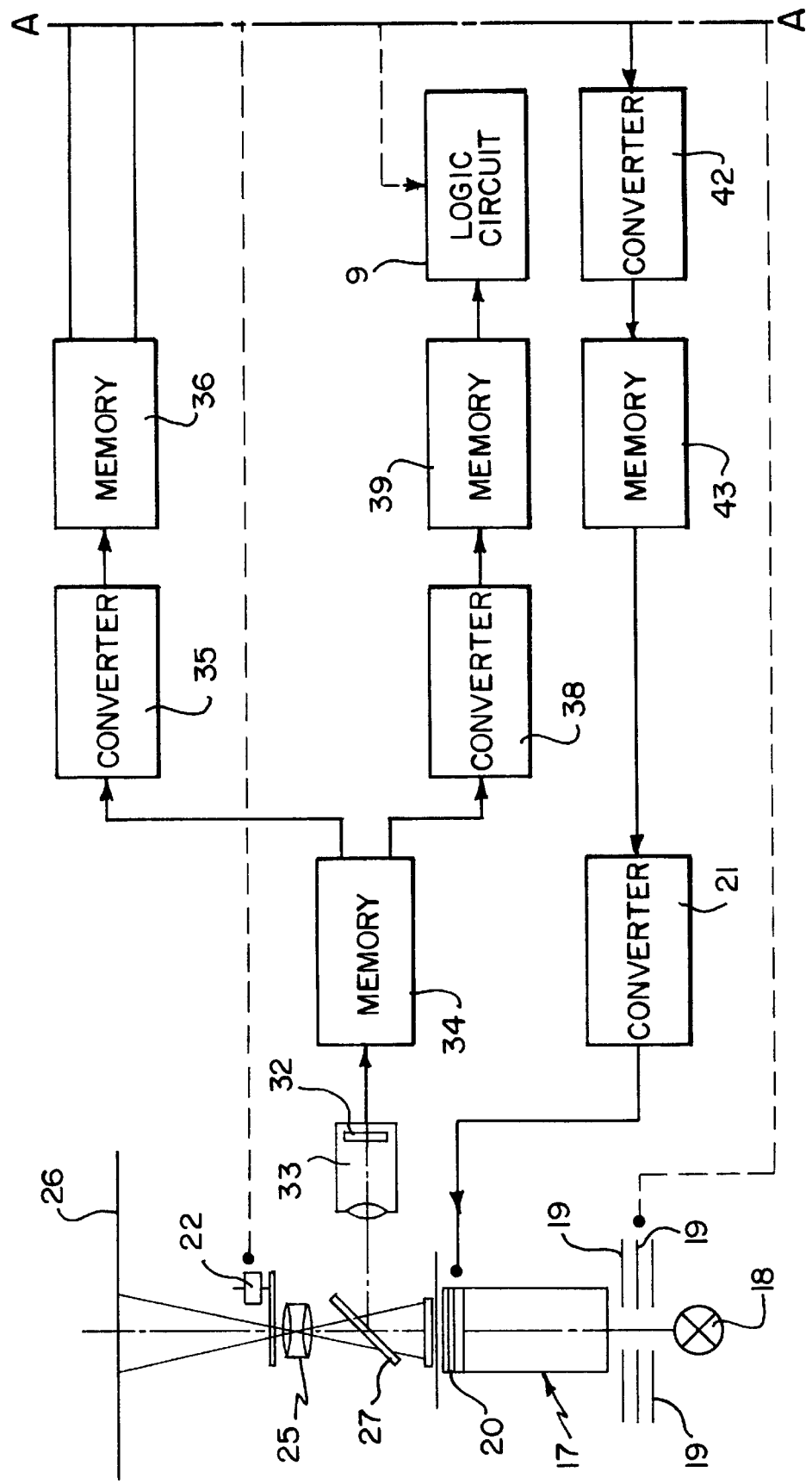
FIG. 3 schematically illustrates a printer which is particularly suitable for professional photography.
Figure 3B:
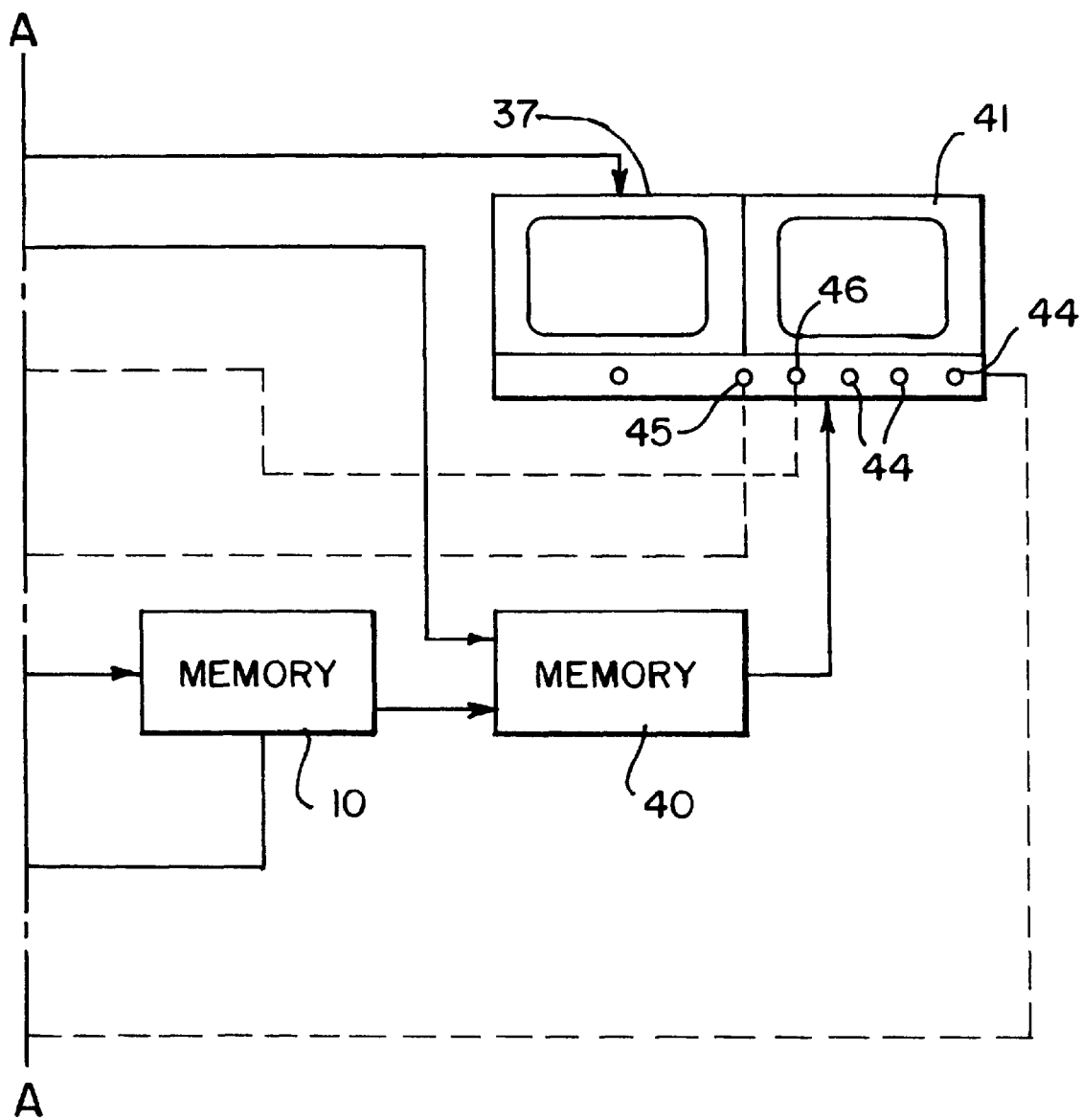

In FIG. 3, the masking matrix 20 is initially transparent when a negative of the film 1 enters the scanning and printing station. Light from the light source 18 passes through the matrix 20 and then through the negative before arriving at the pivotable reflector 27. The reflector 27 directs the light to the flat, color CCD 32 which here constitutes part of a video camera 33. The negative is thus imaged on the CCD 32. The CCD 32 generates signals representing a negative color image of the negative, that is, signals representing the density values of the negative in the primary colors red, green and blue. The color image of the negative is stored in the memory 34. From the memory 34, the color image is transferred to a converter 35 which reverses the image. The resulting positive color image is stored in a memory 36 and then displayed on a color monitor 37.

The negative color image in the memory 34 is simultaneously transformed into a black-and-white image in a converter 38, and this black-and-white image is stored in a memory 39. The memory 39 is connected to the logic circuit 9 which calculates a negative black-and-white mask. The negative black-and-white mask derived in the logic circuit 9 is stored in the memory 10.

A masked, positive color image is now produced in a memory 40 from the mask in the memory 10 and the positive color image in the memory 36. This image is displayed on the color monitor 41.

A positive black-and-white mask is generated in a converter 42 from the negative black-and-white mask in the memory 10. The positive black-and-white mask from the converter 42 is stored in a memory 43. The memory 43 issues signals representing density values for the positive black-and-white mask stored therein and such signals are transformed into control signals for the masking matrix 20 in the converter 21.

An operator can directly compare the unmasked image of the negative shown on the monitor 37 with the mechanically masked image which is shown on the monitor 41. Three operating knobs 44 are provided for color corrections. A color correction made by way of the knobs 44 operates directly on the color filter or light mixing arrangement 19 and is thus immediately visible on the two monitors 37,41. Another operating knob 45 is provided for correction of the mask. Correction of the unsharp mask via the operating knob 45 influences the mask gradation in the logic circuit 9 and can accordingly be immediately seen on the monitor 41. An additional operating knob 46 on the monitor 41 serves to correct the density. Correction of the density by means of the operating knob 46 affects, via the non-illustrated circuit for calculation of print density, the length of time for which the shutter 22 remains open.

When the operator considers the image on the monitor 41 to be optimal, the exposure procedure can be initiated. To this end, the masking matrix 20 is first activated, the reflector 27 pivoted out of the optical path and the shutter 22 opened. The negative in the scanning and printing station, together with the mask, is then printed on the photosensitive paper 26 via the lens arrangement 25.

It is possible, of course, to dispense with the monitor 37 and to display only the masked positive image on the monitor 41. However, in order to optimize the operator's judgment, it has been found favorable to compare the masked image with the unmasked image.

The mask formed on the matrix 20, or an image of the mask on a negative, i.e., in the plane of the film 1, or both the mask and such image, have low resolution, that is, are fuzzy or unsharp. As a result, a diffuse or unsharp intensity distribution is obtained on the photosensitive paper 26. By making the mask and/or the image of the mask in the plane of the film 1 unsharp, bright/dark gradations on the photosensitive paper 26 caused by the mask in response to relative shifting or differential expansion of the mask and a negative are greatly reduced. Print quality is thus improved.

A negative may, for example, have a resolution of 10 line pairs per millimeter. In contrast, the resolution of the mask and/or the image of the mask in the plane of the film 1 can be between 0.1 and 2 line pairs per millimeter, and is preferably 0.7 line pair per millimeter. A mask of low resolution may be obtained by selecting a masking matrix 20 of appropriate coarseness. The image of the mask in the plane of the film 1 can be made to have low resolution by appropriate adjustment, e.g., defocusing, of the lens unit or objective 23.

According to one embodiment of the invention, the mask has low resolution and the copying operation is performed in such a manner that a sharp image of the mask is formed on the photosensitive paper 26.

In accordance with another embodiment of the invention, the mask is sharp, i.e., has high resolution, and the copying operation is carried out such that an image of the mask in the plane of the film 1 has low resolution.

An additional embodiment of the invention resides in that the mask has low resolution and that the copying operation is performed in such a manner that the image of the mask in the plane of the film 1 likewise has low resolution.

Although the invention has been described with reference to the reproduction of photographic negatives, it can be applied as well to the reproduction of photographic positives.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of reproducing a master, comprising the steps of masking said master, the masking step including generating a mask which represents a negative of said master; and copying the masked master on photosensitive material, at least one of the masking and copying steps being performed in such a manner that said mask has low resolution, or said mask is used in an unsharp manner to yield a low resolution image of the mask on the photosensitive material, or both, wherein low resolution means a resolution of about 0.1 to about 2 line pairs per millimeter in the plane of the master being masked.

2. The method of claim 1, wherein said mask has low resolution and the copying step comprises sharply focusing said mask on said photosensitive material.

3. The method of claim 2, wherein said mask is black-and-white.

4. The method of claim 1, wherein said mask has high resolution and is used in an unsharp manner to generate a low resolution mask image on the photosensitive material.

5. The method of claim 4, wherein said mask is black-and-white.

6. The method of claim 1, wherein both said mask and said copying step are performed to yield low resolution.

7. The method of claim 6, wherein said mask is black-and-white.

8. The method of claim 1, further comprising the step of scanning said master to generate density values, at least one of the masking and copying steps being performed using said density values.

9. The method of claim 1, wherein said mask generating is performed electronically.

10. The method of claim 9, wherein the copying step comprises exposing said photosensitive material pointwise.

11. The method of claim 9, further comprising the step of processing said mask so that a region of said mask having a predetermined intensity is imaged on said photosensitive material on a reduced scale.

12. The method of claim 9, wherein said master is transparent and the copying step comprises transmitting copy light to said photosensitive material through said master.

13. The method of claim 1, wherein said exposing is performed using a cathode ray tube or a laser.

14. The method of claim 1, wherein said master is transparent and said mask generating is performed using a phototropic masking element, the copying step comprising transmitting copy light to said photosensitive material through said master and said phototropic masking element.

15. The method of claim 14, wherein said phototropic masking element comprises glass or a foil.

16. The method of claim 1, wherein said master is transparent and said mask generating is performed using an electronically adjustable masking element, the copying step comprising transmitting copy light to said photosensitive material through said master.

17. The method of claim 16, wherein said electronically adjustable masking element comprises an electrooptical component.

18. The method of claim 16, wherein said electronically adjustable masking element comprises a light valve.

19. The method of claim 16, wherein said electronically adjustable masking element comprises a liquid crystal display or a plasma display.

20. The method of claim 1, wherein said mask generating is performed using a reflector.

21. The method of claim 1, wherein said mask generating is performed in such a manner that said mask has a region of maximum brightness corresponding to a predetermined zone of said photosensitive material, the copying step including limiting darkening of said predetermined zone to that resulting from the characteristics of said material.

22. The method of claim 1, further comprising the steps of determining density values for the masked master, and calculating an amount of copy light for the copying step using said density values.

23. The method of claim 22, wherein the copying step comprises automatically controlling exposure of said photosensitive material.

24. The method of claim 22, wherein the determining step comprises scanning said master to obtain first density values, and deriving second density values for said mask from said first density values, the calculating step being performed using said first and second density values.

25. The method of claim 22, further comprising the steps of scanning said master to obtain first density values, and deriving second density values for said mask from said first density values; and wherein the masking step comprises generating said mask using said second density values and the determining step comprises scanning said master once the latter has been masked with the thus-generated mask.

26. The method of claim 1, further comprising the steps of scanning said master to obtain density values, and automatically determining the degree of masking using said density values.

27. The method of claim 1, further comprising the steps of displaying a first image of said master while unmasked, displaying a second image of said master while masked, and evaluating said images.

28. The method of claim 27, wherein at least one of said images is in color.

29. The method of claim 27, wherein at least one of said images is black-and-white.

30. The method of claim 27, further comprising the step of adjusting said second image by changing the degree of masking.

31. The method of claim 27, further comprising the step of adjusting the density and color of each of said images.

32. The method of claim 1, wherein said master is a photographic master.

* * * * *